United States Patent [19]

Mooney et al.

[11] Patent Number: 5,246,790
[45] Date of Patent: Sep. 21, 1993

[54] REMOTE CONTROLLED BATTERY

[75] Inventors: Jon W. Mooney, Amelia; Robert P. Hertlein, Cincinnati, both of Ohio

[73] Assignee: KDI Precision Products Inc., Cincinnati, Ohio

[21] Appl. No.: 917,956

[22] Filed: Jul. 24, 1992

[51] Int. Cl.⁵ ............................................. H01M 2/10
[52] U.S. Cl. ........................................ 429/7; 429/9; 429/97
[58] Field of Search ........................ 429/96–100, 429/1, 7, 9, 90, 122; 455/90, 127–129, 343, 347

[56] References Cited

U.S. PATENT DOCUMENTS

| | | | |
|---|---|---|---|
| 3,473,966 | 10/1969 | Fritch | 429/100 X |
| 3,990,919 | 11/1976 | Krueger | 429/100 |
| 4,371,594 | 2/1983 | Ohara et al. | 429/97 |
| 4,532,194 | 7/1985 | Liautaud et al. | 429/99 |
| 4,747,420 | 4/1988 | Ikeda et al. | 429/1 |
| 4,969,206 | 11/1990 | Desrochers | 429/9 X |
| 4,991,225 | 2/1991 | Holcomb | 429/100 X |
| 5,001,772 | 3/1991 | Holcomb et al. | 429/99 |
| 5,061,579 | 10/1991 | Ishimoto | 429/96 |

Primary Examiner—Anthony Skapars
Attorney, Agent, or Firm—Sughrue, Mion, Zinn, Macpeak & Seas

[57] ABSTRACT

A remote controlled battery which can be readily substituted for any standard size battery includes a smaller standard size battery and a remote controlled switching circuit inside a hollow casing identical to that of the standard size battery. An anode and a cathode can be electrically connected and disconnected with respect to each other by operation of the remote controlled switching circuit so that any appliance, toy or electrically operated device can be converted into a remote controlled device by substituting the remote controlled battery for a standard battery in the device.

7 Claims, 3 Drawing Sheets

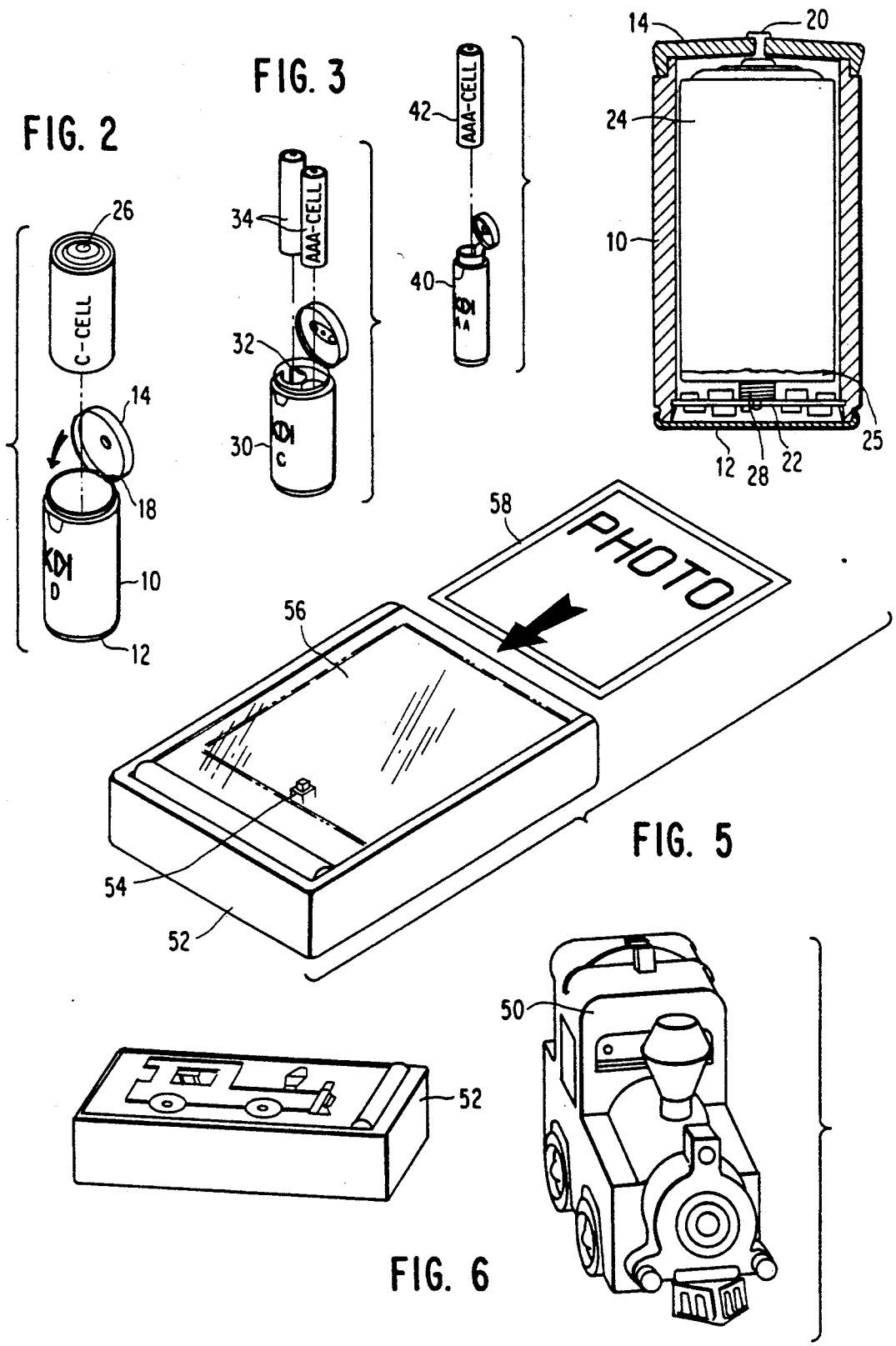

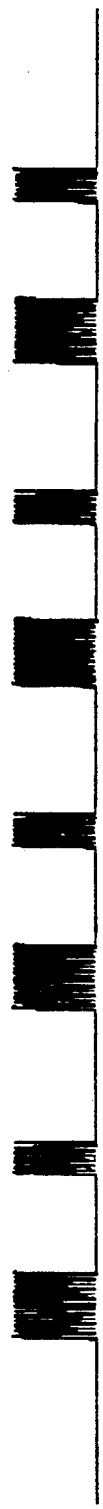
FIG. 8(A) R.F. SIGNAL (NODE 1)
FIG. 8(B) QUENCH SIGNAL (NODE 2)
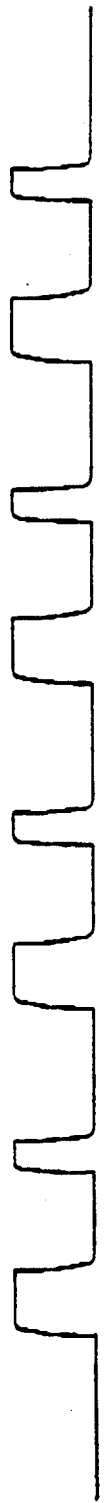
FIG. 8(C) DEMODULATED SIGNAL (NODE 3)
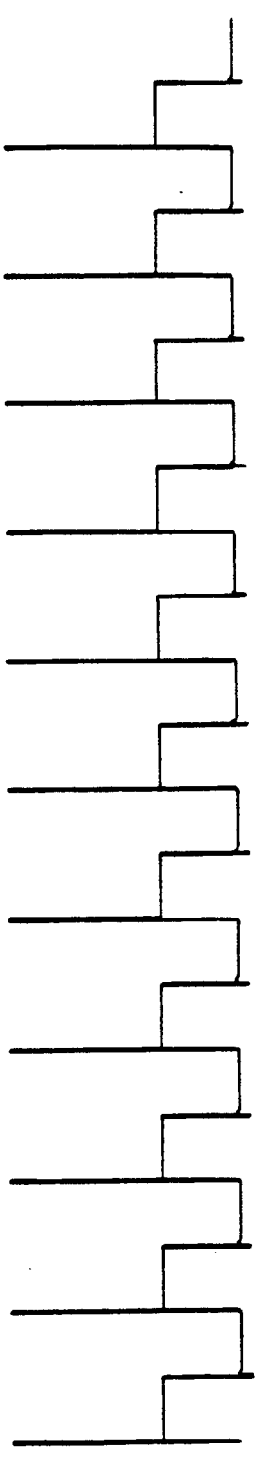
FIG. 8(D) COIL DRIVE WAVEFORM (NODE 4, AFTER VALID ADDRESS)

REMOTE CONTROLLED BATTERY

BACKGROUND OF THE INVENTION

The present invention is directed to a remote controlled battery and more specifically to a battery for use in a remote controlled device wherein the battery has an exterior casing of one size with terminals at opposite ends and a complete battery of smaller size and a remote controlled receiver and switch disposed inside the external casing in contact with the terminals of the exterior casing.

Remote controlled battery operated devices are old and well-known and generally contain one or more batteries connected in a circuit with a load and a remote controlled switch. The circuitry for receiving a remote signal for controlling the on/off condition of the switch is generally mounted directly in the device to be controlled and accordingly, the device must be manufactured with the intent to operate as a remote controlled device.

The Holcomb et al. U.S. Pat. No. 5,001,772 granted Mar. 19, 1991, discloses a power pack having a concealed radio transmitter for use with a portable cellular telephone. The usual battery compartment in the housing of the power pack has a shortened battery compartment to accommodate a lesser number of batteries or smaller sized batteries. As a result, space is provided in a second compartment within the housing of the battery pack in which a printed circuit board carrying a radio transmitter may be mounted. The radio transmitter is provided solely for the secret transmission of telephone conversations being normally conducted on the portable cellular telephone.

SUMMARY OF THE INVENTION

The present invention provides a new and improved remote controlled battery device which can readily be substituted for a standard battery in any battery operated device to convert the battery operated device from a conventional manual switch operated device to a remote controlled device.

The remote controlled battery according to the present invention can readily be substituted for any standard size battery wherein the remote controlled battery has a hollow casing identical to that of the standard size battery with an anode and a cathode disposed at opposite ends thereof, a battery of a size smaller than the standard size battery disposed in the hollow casing with an anode disposed in contact with the anode of the hollow standard size casing and a remotely controlled switch means disposed in the standard size battery casing between the cathode of the standard size battery casing and the cathode of the smaller sized battery whereby, upon closing of the switch means upon receiving a remote signal, the circuit will be closed between the anode and the cathode of the standard size hollow battery casing to energize the device in which the remote controlled battery is mounted.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a side elevation view, partly in section, of a remote controlled battery according to a first embodiment of the present invention.

FIG. 2 is an exploded perspective view of the battery shown in FIG. 1.

FIG. 3 is an exploded perspective view of a remote controlled battery according to a second embodiment of the present invention.

FIG. 4 is an exploded perspective view of a remote controlled battery according to a third embodiment of the present invention.

FIG. 5 is an exploded perspective view of a transmitter device suitable for use with the remote controlled battery.

FIG. 6 is an exploded perspective view of a transmitter of FIG. 5 in combination with a toy adapted to be operated by the remote controlled battery of the present invention.

FIGS. 8(A), 8(B), 8(C) and 8(D) are wave diagrams associated with the circuit of FIG. 7.

DETAILED DESCRIPTION OF THE INVENTION

Figure 7:
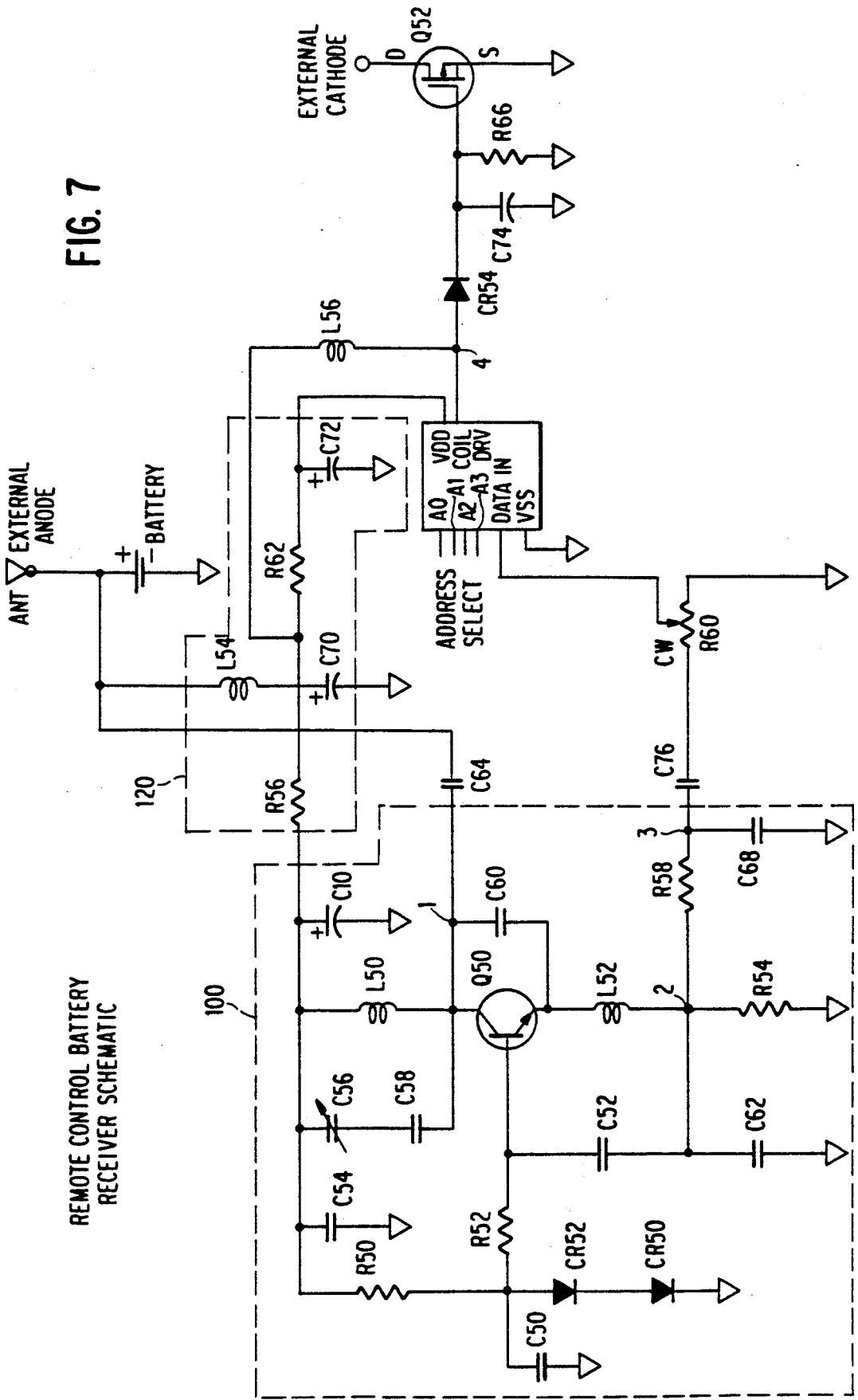
FIG. 7 is a schematic circuit diagram for a receiver according to the present invention.

The remote controlled battery according to the embodiment shown in FIGS. 1 and 2 is comprised of a hollow shell consisting of a tubular casing 10 with a bottom cover or cathode 12 secured thereto and a removable top cover 14 detachably connected to the casing. The casing may be of any suitable non-conductive material such as the conventional material used in a battery casing. The bottom cover or cathode 12 is of conductive material and is permanently secured to the casing to act as the negative contact. The upper cover 14 may be completely removable or may be pivotally connected to the casing 10 at one side by integral hinges 18, as shown in FIG. 2. The upper cover 14 is provided with an anode 20 extending therethrough which acts as the positive contact. Thus, the casing 10 with the top and bottom covers secured thereto define a hollow shell which is dimensioned identically to and has the external appearances of a conventional D-sized battery.

A circuit board 22 having all of the electronic components of a receiver circuit, which will be described in detail hereinafter, is secured in the hollow casing 10 in closely spaced relation to the bottom wall or cathode 12 by any suitable means. A conventional C-sized battery 24 is removably located in the casing immediately above the circuit board 22. A spring 28 is disposed between the circuit board 22 and the cathode 25 of the battery 24, whereby the spring 28 biases the battery 24 upwardly to bring the anode 26 of the C-sized battery 24 into contact with the anode 20. The receiver circuit on the circuit board 22 is electrically connected between the cathode 25 of the C-sized battery 24 and the cathode 12 of the D-sized shell. Thus, upon receiving a signal from a remote transmitter, the receiver circuit will close a switch to electrically connect the anode and cathode of the battery 24 to the anode and cathode of the D-shell so that the D-shell acts as a regular battery which can be used in any appliance, toy or other electrically operated device in which a D-sized battery would ordinarily be used.

Upon replacing a conventional D-sized battery in an electrically operated device with the remote controlled battery according to the present invention, the electrically operated device can then be remotely controlled without need for manually operating a switch on the electrically operated device to turn the device ON or OFF. If the electrically operated device has an ON-OFF switch, the switch can be left in the ON position at all times with the flow of electrical current in the device being controlled by the remote controlled battery.

In the embodiment of FIG. 3, a C-sized remote controlled battery 30 is provided with a hollow shell similar to that disclosed in FIG. 1. However, a suitable support 32 having two cylindrical recesses therethrough is located within the shell of the remote controlled battery 30 for supporting two AAA-sized batteries 34 therein. The two batteries 34 would be electrically connected to the anode and cathode of the remote controlled battery 30 in the same manner as disclosed in the embodiment of FIG. 1.

In the embodiment of FIG. 4, a AA-sized battery 40 is provided with a single AAA-sized battery 42 which is electrically connected therein in a manner similar to that disclosed in FIG. 1. Thus, depending upon the size of the electrically operated device and the type of batteries which are ordinarily used for powering the device, an appropriately sized remote controlled battery can readily be substituted therefore.

An example of such an electrically operated device is shown in FIG. 6 as a battery operated locomotive. Assuming the battery operated locomotive utilizes one or more D-sized batteries, one of the D-sized batteries would be replaced by the remote controlled battery as shown in FIGS. 1 and 2 of the present application. With the normal ON-OFF switch (not shown) of the locomotive being in the ON position, the remote controlled battery will function to control the operation of the locomotive. A transmitter 52, having a picture of a locomotive thereon, as shown in FIG. 6, is used to send a control signal to the remote controlled battery in the toy locomotive 50 to either turn the power ON or OFF. As shown in FIG. 5, the transmitter 52 includes conventional transmitter circuitry (not shown) including a push button switch 54. The upper cover 56 of the transmitter may be of any flexible resilient material so that upon application of pressure on the cover 56, the cover will be depressed to in turn depress the push button switch 54, thereby activating the transmitter to send a signal to the toy locomotive 50 to supply electrical power to the toy locomotive. A picture 58 of the toy locomotive may be removably secured to the flexible cover 56 by any suitable means. Thus a child can readily push the picture of a locomotive and thereby cause the locomotive to operate. A plurality of transmitters having different pictures of toys thereon and a plurality of corresponding toys may be used in conjunction with the receiver circuitry which will be described in detail hereinafter. The receiver circuitry can discriminate between the signals transmitted by the different transmitters so that only the appropriate battery operated toy will be operated.

As shown in FIG. 7, the circuit includes an antenna ANT connected to the external anode of the battery, a conventional self-quenching super-regenerative RF detector 100, an IC comparator 110, a power supply circuit 120 for the IC comparator 120, an inductor L56 connected to a COIL DRV output pin of amplifier, a diode CR54, a capacitor C74, a resistor connected in parallel with capacitor C74, a MOSFET Q52, a coupling capacitor C64 for coupling the ANT to the RF detector 100, a coupling capacitor C76 for A.C. coupling the output of the RF detector 100 to the DATA IN pin of the IC comparator 110 via an adjustable resistor R60.

The RF detector 100 includes a tank circuit consisting of capacitors C56, C58 and an inductor L50, a bipolar transistor Q50 having its collector connected to the tank circuit, and an integrator circuit consisting of inductor L52 and capacitor C62. The RF detector 100 further includes a bypass capacitor C54, resistors R50, R52, R54, R58, diodes CFR 50, 52 and capacitors C10, C50, C52, C60 and C68.

The IC comparator 110 includes four address select pins A0–A3, a DATA IN pin, a ground pin VSS, a power supply pin VDD and an output COIL DRV pin. Each of the address pins A0–A3 is hard-wired to either ground (logic "zero") or to Vdd (logic "one"), thereby storing a predetermined four-bit address signal. Accordingly, the IC data amplifier/decoder can store one of sixteen different four-bit addresses using the four pins A0–A3.

The power supply circuit 120 includes resistors R56 and R62, capacitors C70 and C72, and an inductor L54 which serve to supply the appropriate power to the VDD pin of the IC comparator 110.

The operation of the remote control battery receiver shown in FIG. 7 will now be described in connection with FIGS. 8(A)–8(D) which show the wave forms at nodes 1, 2 and 3 of the RF detector 100.

When the antenna ANT receives an RF signal, the received signal is provided to the RF detector 100 via coupling capacitor C64. FIG. 8(A) shows the RF signal at node 1 of the RF detector 100. As shown in FIG. 8(A), in this example, the received RF signal consists of a sequence of four pulses which has been repeated for a total of eight pulses. In an idle state in which no RF signal is received by the antenna ANT, the RF detector 100 generates a quench signal at node 2, as shown in FIG. 8(B). The quench signal has a frequency of between 300–400 kHz during the idle state.

In an active state in which an RF signal is received by antenna ANT and provided to the RF detector 100 via capacitor C64, the frequency of the quench signal slightly increases (on the order of about 50 kHz) due to the received RF signal being coupled to the collector of transistor Q50. As a result, during the active state, the average current in the emitter resistor R54 increases.

A low pass filter, consisting of resistor R58 and capacitor C68, serves to extract the quench signal, thereby leaving a demodulated signal at node 3. FIG. 8(C) shows the demodulated signal at node 3 which resembles the received RF signal at node 1 (see FIG. 8(A)). The demodulated signal is applied to the DATA IN pin of the IC comparator 110 via capacitor C76 and variable resistor R60. The capacitor C76 and variable resistor R60 serve to adjust the signal level of the demodulate signal at node 3 to a level which is compatible with the IC comparator 110. Upon receiving the demodulated signal at the DATA IN pin, the IC comparator 110 compares the demodulated signal with the address signal stored therein (i.e., the address defined by the address select pins A0–A3). If the demodulated signal is coincident with the stored address, then the IC comparator 110 outputs a 1.5 V signal at the COIL DRV pin. In order to ensure integrity in the comparison, both the former and latter four pulses of the eight-pulse demodulated signal are compared with the four bit address signal stored in the IC comparator 110, and the 1.5 V signal at the COIL DRV pin is not output unless both the former and the latter four pulses match the stored address signal.

The 1.5 V signal output at the COIL DRV pin serves to rapidly switch current on and off through the inductor L56. As a result of this rapid switching, a ringing waveform is produced at node 4. FIG. 8(D) shows the wave form at node 4. As shown in FIG. 8(D), the waveform includes a large overshoot or spike which is on the order of 10–12 V. The waveform at node 4 is applied to capacitor C74 via diode CR54. The diode CR54 serves to rectify the waveform, and the capacitor C74 serves to store the rectified waveform. In this manner, a sufficiently high voltage signal is applied at the gate of MOSFET Q52. That is, in order to turn MOSFET Q52 ON, a sufficiently high voltage signal must be applied to its gate (i.e., a voltage which is greater than the 1.5 V signal output at the COIL DRV pin of the IC comparator 110). The resistor R66 which is connected to the gate of MOSFET Q52 serves as a discharging resistor for the capacitor C74. When MOSFET Q52 is turned ON, it connects the external cathode to the cathode of the internal battery, thereby allowing the remote control battery to supply power to the external device.

While the invention has been particularly shown and described with reference to preferred embodiments thereof, it will be understood by those in the art that the foregoing and other changes in form and details may be made therein without departing from the spirit and scope of the invention.

What is claimed is:

1. A remote controlled battery comprises a hollow shell having a size of a standard sized battery adapted to receive therein at least one battery of a smaller standard size, said hollow shell being comprised of a hollow cylindrical casing having a bottom wall of electrically conductive material constituting an external cathode secured thereto, a top wall having an electrically conductive anode extending therethrough detachably connected thereto and remote controlled circuit means secured therein adjacent said bottom wall, said circuit means being electrically connected to said bottom wall and a spring on said circuit means which is adapted to electrically engage a cathode of the smaller standard sized battery and bias the smaller standard sized battery to bring an external anode on the smaller standard sized battery into contact with the anode on the top wall of the shell.

2. A remote controlled battery according to claim 1, further comprising support means within said hollow shell for supporting a plurality of smaller standard sized batteries therein in electrical contact with said circuit means and said anode in said top wall of said shell.

3. A remote control battery as defined in claim 1, further comprising an antenna, adapted to be connected to the external anode of said battery, for receiving an RF signal, an RF detector circuit coupled to said antenna, and a comparator circuit for comparing an output of said RF detector with a predetermined signal.

4. The remote control battery as defined in claim 3, wherein said comparator circuit outputs a coil drive signal only if the output of said RF detector is coincident with the predetermined signal.

5. The remote control battery as defined in claim 4, further comprising an inductor coupled to receive the coil drive signal.

6. The remote control battery as defined in claim 5, further comprising a switching circuit, coupled to said inductor, operable in response to the coil drive signal for connecting the external cathode on said shell to a cathode of said smaller size battery, thereby allowing power to be supplied to an external device.

7. The remote control battery as defined in claim 6, wherein said switching circuit is a MOSFET having its gate coupled to said inductor, and its drain coupled to the external cathode on the shell.

* * * * *